W. G. SHELDON.
COMBINED TYPE WRITING AND COMPUTING MACHINE.
APPLICATION FILED MAR. 6, 1915.

1,293,219.

Patented Feb. 4, 1919.
4 SHEETS—SHEET 2.

WITNESSES:
M. F. Hannweber
R. H. Strother.

INVENTOR:
William G. Sheldon
By Jacob Felbel
HIS ATTORNEY

W. G. SHELDON.
COMBINED TYPE WRITING AND COMPUTING MACHINE.
APPLICATION FILED MAR. 6, 1915.

1,293,219.

Patented Feb. 4, 1919.
4 SHEETS—SHEET 3.

WITNESSES:
M. F. Hanmacher
R. H. Strother

INVENTOR:
William G. Sheldon
By Jacob Felbel
HIS ATTORNEY

W. G. SHELDON.
COMBINED TYPE WRITING AND COMPUTING MACHINE.
APPLICATION FILED MAR. 6, 1915.

1,293,219.

Patented Feb. 4, 1919.
4 SHEETS—SHEET 4.

WITNESSES:

M. F. Hannweber

R. H. Strother

INVENTOR

William G. Sheldon

By Jacob Felbel

His ATTORNEY

UNITED STATES PATENT OFFICE.

WILLIAM GARFIELD SHELDON, OF BROOKLYN, NEW YORK, ASSIGNOR TO REMINGTON TYPEWRITER COMPANY, OF ILION, NEW YORK, A CORPORATION OF NEW YORK.

COMBINED TYPE-WRITING AND COMPUTING MACHINE.

1,293,219.     Specification of Letters Patent.     Patented Feb. 4, 1919.

Application filed March 6, 1915. Serial No. 12,534.

*To all whom it may concern:*

Be it known that I, WILLIAM GARFIELD SHELDON, citizen of the United States, and resident of the borough of Brooklyn, city of New York, in the county of Kings and State of New York, have invented certain new and useful Improvements in Combined Type-Writing and Computing Machines, of which the following is a specification.

My invention relates to computing machines and to combined typewriting and computing machines.

One of the objects of my invention is to provide improved means for automatically connecting the computing mechanism up for operation when the typewriter carriage is in a computing zone and for automatically disconnecting said computing mechanism or rendering it inoperative at other times.

Another object of my invention is to provide automatic means controlled by the carriage for changing the character of the arithmetical operation performed by the computing mechanism. In the form of the invention shown in the accompanying drawings, provision is made for registering numbers in two columns and means are provided whereby numbers registered in one of said columns are automatically added and numbers registered in another column are automatically subtracted.

Another object of my invention is to provide means for throwing the automatic add and subtract device out of operation at will, so that the machine can be set for addition and subtraction by hand as heretofore.

Another object of my invention is to provide means for temporarily changing, at the will of the operator, from add to subtract or vice versa, notwithstanding the automatic add and subtract mechanism is in use. This last means is designed chiefly for making corrections.

This automatic add and subtract mechanism is applicable to some computing machines in which there is no typewriting mechanism.

To the above and other ends which will hereinafter appear, my invention consists in certain features of construction and combinations and arrangements of parts, all of which will be fully set forth herein and particularly pointed out in the claims.

In the accompanying drawings,

Figs. 1, 2, 4 and 9 are on a reduced scale.

In all of the figures parts have been omitted or broken away or shown in section as has been found convenient.

My invention is here shown applied to a Remington-Wahl typewriting and computing machine, consisting of a Wahl computing machine mounted on and operatively connected with a Remington No. 11 typewriter.

Figure 9:
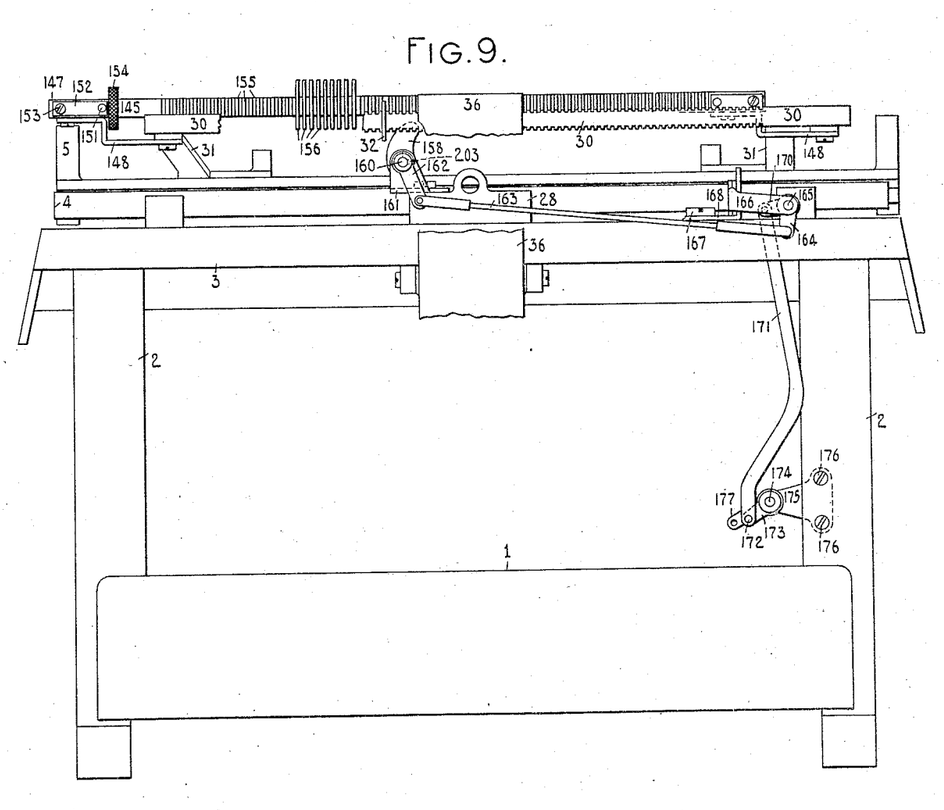
Fig. 9 is a rear elevation of the machine.

The main frame of the No. 11 Remington machine comprises a base 1, corner posts 2 and top plate 3 on which are mounted stationary rails 4 for the traverse of a carriage 5 by means of bearing balls or rollers 6. The carriage 5 has mounted therein a platen 7 and it is drawn toward the left by a spring drum 8. Against the front face of the platen 7 are adapted to strike the types 9 mounted on front-strike type bars 10 which are pivotally mounted on a segment 11. Said type bars 10 are connected by links 12, sub-levers 13 and links 14 with printing key levers 15 having keys or buttons 16 mounted on the forward ends thereof. Some of these keys are designated with numerals and others with letters and other characters. The key levers are all pivoted on a bar 17 in the rear of the machine and provided with returning springs 18. Said key levers are all adapted to operate a universal bar 20 which hangs from arms 21 of a rock shaft 22 pivoted in the base 1 and having another arm 23 connected by a link 24 with escapement mechanism of a sort well-known in the art but not shown in the present instance, said escapement mechanism being part of a carriage feed mechanism which also includes a feed rack 25 pivotally mounted on the carriage 5 and normally meshing with a feed pinion 26 mounted on a shaft 27 (Fig. 1), which shaft is journaled in a bracket 28 (Fig. 9) mounted on the top plate 3.

The typewriter is also equipped with a denominational tabulator including a column stop bar 30 mounted on brackets 31 projecting upward and rearward from the carriage 5. Said rack bar is formed with a series of slots in its upper and lower edges spaced a letter space distance apart and in which are adapted to be mounted column stops 32 of well-known construction. These are adapted to be arrested by key operated denominational stops 33 consisting of the upper ends of long levers 34 which are pivoted at 35 in a frame 36 attached to the typewriter framework. The levers 34 are operated by push rods 37, each equipped with a returning spring 38. Said rods have denominational tabulator keys 40 mounted on their forward ends, said keys being operated by pushing them toward the rear. The tabulator is provided with a universal bar 41 mounted on a rock shaft 42 and connected by means of a link 43, arm 44, rock shaft 45, arm 46 and link 47 with a release lever at the top of the machine, which release lever is adapted to lift the feed rack 25 out of the pinion 26. This release mechanism is provided with a restoring spring 48.

Figures 4, 12:
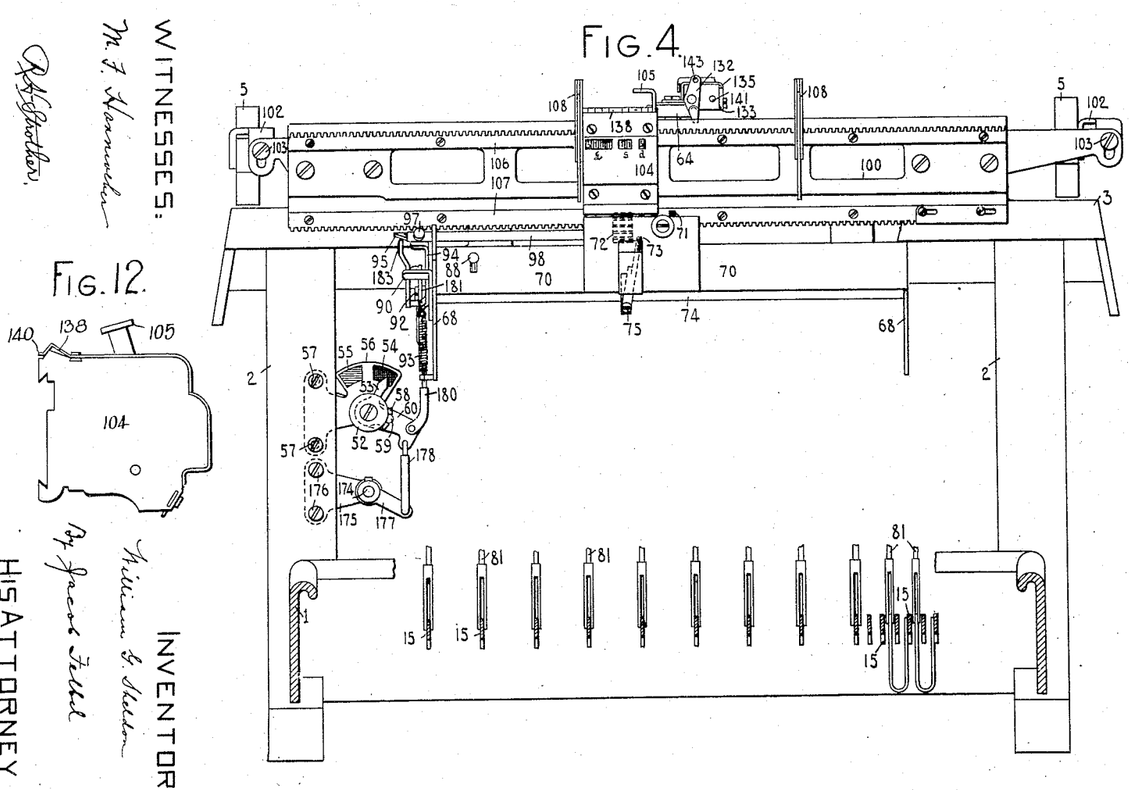
Fig. 4 is a front elevation of the machine shown in Fig. 1.
Fig. 12 is a left-hand side elevation of the frame and casing of the totalizer.

The typewriting machine also includes ink ribbon mechanism comprising an ink ribbon 50 which is drawn through a ribbon vibrator or vibratory guide 51 at the front of the platen. This guide is vibrated to cause the ribbon to cover the printing point at each operation of the universal bar 20 by means which it has not been deemed necessary to illustrate in detail. In the present instance said ribbon vibrating mechanism includes means whereby the extent of throw imparted to said vibrator 51 at each key stroke can be varied so as to cause either the upper or the lower half of the ribbon to be struck by the types as desired. The ribbon vibrating mechanism may be of any suitable character, that which is now in actual use in the No. 11 Remington being substantially like that shown in the patent to Yaw No. 920,410, dated May 4, 1909. The means adjustable to change the throw of the ribbon, includes a button 52 arranged to be turned by hand, said button, as shown in Fig. 4, having a pointer 53 connected therewith to indicate two indices 54 and 55 on a plate 56, which plate is secured by screws 57 to one of the front posts 2. The plate of which the pointer 53 is a part, also includes a notched section 58 into which a pin 59 is adapted to project from an arm 60, which arm is loose on a shaft 61 (Fig. 1) on the front end of which shaft the knurled head or button 52 is splined. Said head 52 is capable of being pulled out a short distance from the position shown in Fig. 1. When the button is thus pulled out the segment 58 becomes disconnected from the pin 59 so that at that time the rocking of the shaft by the button 52 does not rock the arm 60 and, vice versa, a rocking of the arm 60 does not turn the button 52 and shaft 61. The turning of this shaft one way or another changes the connections in the vibrator mechanism in the manner set forth in the patent to Yaw above cited, said connections adapting the ribbon mechanism to print in black or blue when the pointer 53 points to the designation 54 and to print in red when said pointer points to the designation 55. The button 52 is yieldingly held in either of its two positions by means of a detent spring 62 (Fig. 1) engaging a double conical part of a hub 63, which hub is rigid on the shaft 61.

Figures 5, 7, 8:
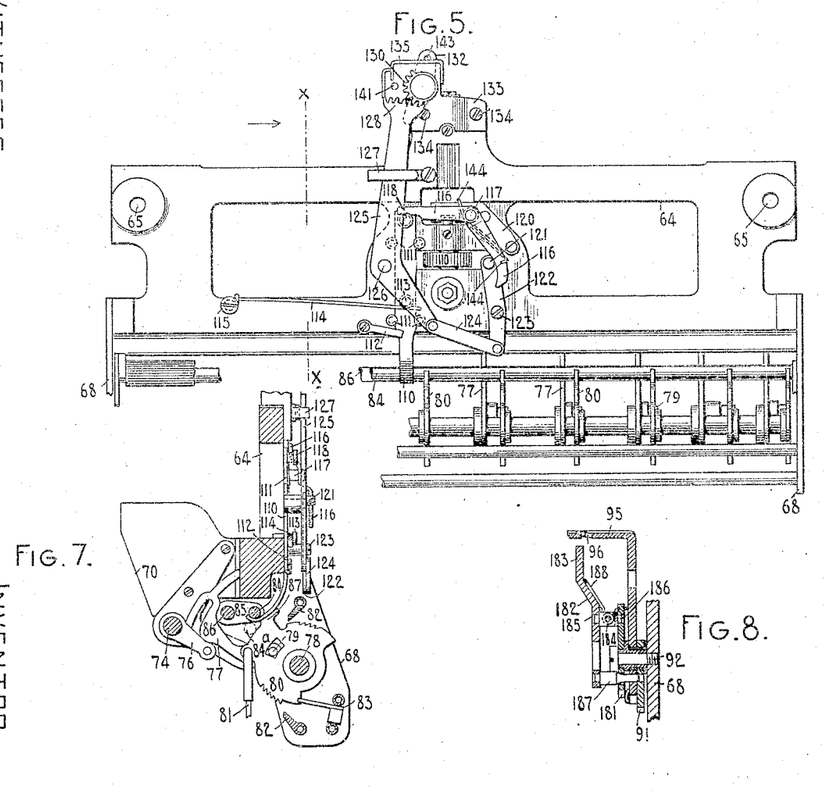
Fig. 5 is a rear elevation of the Wahl actuator detached from the machine and having my improvements applied thereto.
Fig. 7 is a view in vertical section on the line $x$—$x$ of Fig. 5.
Fig. 8 is an enlarged sectional view of part of the add and subtract mechanism, the section being taken about on the line $y$—$y$ of Fig. 1.

The Wahl adding machine has a main stationary frame, the principal element of which is a casting 64, best shown in Fig. 5, which is a rear view. This casting has two holes 65 through which pass the screws, one of whose nuts 66 shows in Fig. 1 and by which screws said casting is rigidly secured to brackets 67 mounted on the top plate 3 of the typewriter. The casting 64, together with other parts including certain vertical plates 68, constitute the main frame of the Wahl actuator, which actuator is not herein shown in all its parts but is designated in a general way in some of the figures of the drawing by the reference numeral 70. Said actuator includes in its mechanism a master wheel 71 (Fig. 4) and pinion 72, the latter slidably mounted on the master wheel shaft and adapted to be engaged, when a numeral key is depressed and when the machine is set for addition, by a segment 73 mounted to turn with a rock shaft 74 and pivoted at 75 on said rock shaft for a fanning motion into and out of gear with the master wheel. The rock shaft 74 carries a spirally disposed series of arms 76, one of which is shown in Fig. 7. Said arms are adapted to be operated by a series of goose-neck cam levers 77, which levers are pivoted on a rod 78 and have pin and slot connection 79 with a series of sectors 80, each of which sectors is connected by means of a link 81 with one of the numeral key levers 15. The actuator also includes certain full stroke devices 82 (Fig. 7) and key arrester devices 83 besides various other mechanism not necessary at this time to be explained. Said actuator also includes a universal bar 84, which universal bar is mounted on arms 85 projecting from a rock shaft 86, which rock shaft is pivoted in the plates 68. The universal bar 84 is adapted to be operated by ears or lugs 87 on the sectors 80. In Fig. 7 the universal bar is shown held up in its inoperative position such that if one of the numeral keys is depressed and the sector 80 rocked by a downward motion of the link 81, the lug 87 will move idly under the universal bar without operating the latter. When the machine is in use and operative, the universal bar 84 normally occupies the dotted line position 84ª of Fig. 7. When said universal bar is in that position and a numeral key is depressed, the universal bar is moved downward and forward until, by the swinging of said universal bar and of the sector about different centers, said universal bar runs out on to the concentric part of the lug 87 and finally, when the key is about at the bottom of its stroke, drops off at the rear end of said concentric part. On the upstroke of the key the universal bar is swung up to the position shown in full lines in Fig. 7 until the key reaches the top of its stroke, when said universal bar drops down again to the position 84ª. When the machine is in use and a numeral key is depressed, the downward and forward stroke of the universal bar is its operating stroke and said universal bar on said operating stroke performs several essential functions in the adding machine, one of them consisting of swinging the segment 73 (Fig. 1) about its pivot 75 into engagement with the pinion 72, if the machine is set for addition, or into engagement with another pinion meshing with said pinion 72 if the machine is set for subtraction. It will thus be seen that when the universal bar is held up in the position shown in full lines in Fig. 7, the adding machine is out of operation for the reason that the universal bar is held where it can not be operated, and for that reason the essential operations above referred to are not performed when a numeral key is depressed; and among other things the segment 73 does not become geared to and does not operate the master wheel 71. The numbers written under these conditions, therefore, are not registered by the computing mechanism.

The Wahl machine as ordinarily heretofore manufactured has in it a handle 88 (Fig. 4) which is used for disconnecting the computing mechanism. This handle when pulled forward and downward causes the universal bar 84 to be raised to and held in its inoperative position shown in full lines in Fig. 7.

Figures 1, 2, 3:
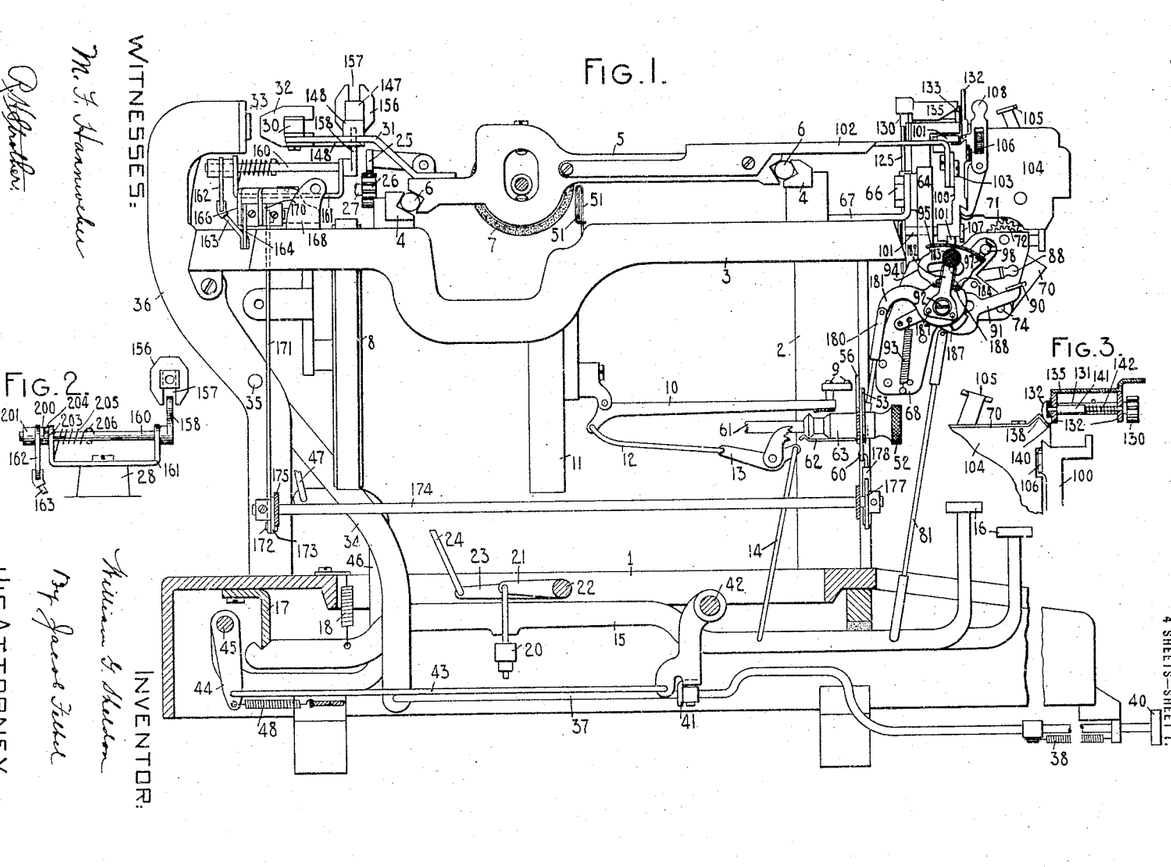
Figure 1 is a side elevation of a Remington-Wahl typewriting and computing machine having my invention embodied therein.
Fig. 2 is a fragmentary view similar to part of Fig. 1 but with the automatic add and subtract mechanism thrown out of operation.
Fig. 3 is a fragmentary right-hand side elevation, partly in section, of a portion of the automatic connect and disconnect mechanism.

Subtraction can be performed upon the Wahl adding machine, a subtraction key or handle 90 being mounted on the left-hand end of the actuator, said key projecting from an arm 91 of a lever which is pivoted on a pivot screw 92 supported in the left-hand one of the frame plates 68 (Figs. 1 and 8). The lever from which the key 90 projects is built up from two pieces of sheet metal as shown in Fig. 8 and comprises three arms, the forwardly directed arm 91 on which the key is mounted, a rearwardly directed arm which is connected with a restoring spring 93, which spring holds the adding mechanism normally at addition, and an upwardly projecting arm 94 having a curved flange 95 projecting therefrom. Said flange has therein a cam slot 96 into which a pin 97 projects from a slide rod 98, which slide rod extends into the actuator adjacent the pinion 72 and controls a sliding change gear mechanism whereby when the parts are in normal position, shown in the drawings, the segment 73 is adapted to engage the pinion 72 directly and whereby when the key 90 is depressed and the rod 98 is moved toward the left the pinion 72 is moved out of range of the segment 73 which then is adapted to engage another pinion that meshes with said pinion 72, thereby reversing the direction of rotation of the master wheel.

The Wahl machine also includes a carriage 100 made in the form of a bar of such an outline as to include a number of trackways which run on various rollers 101 journaled in the frame piece 64 at the middle of the machine. This carriage at its ends is connected with the typewriter carriage 5 by arms 102 connected with said carriage by screws 103. The forward part of the carriage has a dove-tail formation on which one or more totalizers 104 are mounted for adjustment to any desired point lengthwise of the carriage. The Wahl totalizer is provided with a latch lever 105 for coöperation with a toothed bar 106, said bar having its teeth spaced in accordance with the letter spacing of the typewriter carriage. Said carriage is also provided with another toothed bar 107 the teeth of which are used for certain locking purposes. Mounted on said carriage there are shown in the present instance a pair of stops 108 for use in adjusting a totalizer 104 in order to compute in either one of two columns, the totalizer being set against the left-hand stop 108 as shown in Fig. 4 to compute in one column and being set by hand over against the right-hand stop 108 when it is desired to compute in the other column.

The parts thus far described are old and well-known and, as far as most of the features of my invention are concerned, they can be varied greatly; and in fact as far as some of the features of my invention are concerned the typewriting and computing mechanism can be of any known or suitable character.

According to my invention the Wahl computing mechanism is normally held out of operation by means now to be described. As shown in the present instance, a slide bar 110 (Figs. 5 and 7) is mounted on the rear face of the casting 64, being guided for vertical sliding motion by any suitable guides such as headed pins or screws 111 and a flat strip of sheet metal 112 secured to the casting 64. The slide 110 has a headed pin 113 projecting from the rear face thereof and said pin is engaged by a spring 114 which is secured to the frame piece 64 by a screw 115, this spring tending to move the slide bar 110 upward. Said slide bar at its lower end is formed with a hook, as shown, that engages underneath the universal bar 84 and normally holds it up in the position shown in Figs. 5 and 7; but if the bar 110 be forced downward against the tension of the spring 114, then the universal bar 84 will drop down to the position 84ᵃ (Fig. 7) where it is capable of being operated and when, therefore, the computing mechanism is in operative condition. When the computing mechanism is operated the universal bar 84 is swung downward and forward across the hooked end of the bar 110 and it swings back again at the end of the downstroke of the key.

In order automatically to depress the bar 110 when a totalizer comes into position to be operated by the master wheel 71, a train of mechanism is provided including an angled lever 116 pivoted at 117 and overlying a headed pin 118 projecting from the upper end of the bar 110. The pivot 117 happens, in the present instance, to cover a point where the frame 64 is cut away and said pivot is accordingly secured to a bracket 120 secured to said frame piece. The depending arm of the lever 116 is in position to be operated by a pin 121 projecting from the upper arm of a vertical lever 122 pivoted at 123 to the frame piece 64. The lower arm of the lever 122 is connected by a link 124 with one arm of an angled lever 125 pivoted at 126 to the frame piece 64. The lever 125 has a long upstanding arm guided by a stationary loop 127. On the upper end of the lever 125 is a short segmental rack 128 meshing with a mutilated pinion 130 rigidly mounted on the rear end of a shaft 131 (Fig. 6) which shaft, at its forward end, has rigidly mounted thereon a two-armed lever 132. Said lever 132 is situated nearly directly above the master wheel and it normally stands vertically, as shown in Fig. 4 and in such position that when a totalizer 104 passes it, said totalizer deflects the lever into a horizontal position, turning the lower arm of the lever toward the left when the carriage is moving in letter space direction and toward the right if the carriage is being restored toward the right. If the lower arm of the lever is turned toward the operator's left, the upper arm of the lever 125 is turned toward the operator's left, or toward the right in Fig. 5, with the result that, through the train of connections that has been described, the horizontal arm of the lever 116 is moved downward and depresses the bar 110, thus permitting the computing mechanism to be connected up for operation. When the lever 132 is deflected by a totalizer moving toward the right, that is to say, toward the left in Fig. 5, the vertical arm of the lever 125 is moved a short distance toward the left in Fig. 5 at which time the mutilated pinion 130 runs out of the rack 128 and does not move it any further. As soon as the lever 132 resumes its vertical position the mutilated pinion and the rack again come into mesh as before.

Figure 6:
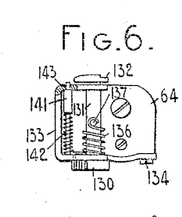
Fig. 6 is a fragmentary top view, partly in section, of part of the automatic connect and disconnect mechanism.

The shaft 131 is journaled in a U-shaped frame 133 of sheet metal which is secured by screws 134 (Fig. 5) to the upwardly projecting middle part of the frame piece 64. Preferably a cover plate 135 (Fig. 5) is mounted on the frame piece 133. Within the casing thus produced, a spring 136 is coiled around the shaft 131, being connected at one end to a pin 137 projecting from said shaft, and the other end of said spring is inserted in a hole in the frame piece 133 as shown in Fig. 6. This spring 136, as far as torsional tension is concerned, is in equilibrium when the parts are in normal position so that said spring will restore the shaft 131 to bring the lever 132 in substantially a vertical position whether said lever has been deflected one way or the other by the passage of a totalizer. The spring is also under compression between the pin 137 and the rear branch of the frame piece 133 so that said spring tends to thrust the shaft 131 longitudinally toward the front of the machine. As will be perceived in Fig. 6 the shaft is a little longer than the frame piece so that the spring normally holds the lever 132 a short distance out in front of the frame piece.

As shown in Fig. 3, the casing of the totalizer of the Wahl computing machine has a sort of rib 138 formed along the top thereof and the forward wall of which rib is utilized as a scale plate to indicate the position of the totalizer with respect to the master wheel. Just back of this rib the top casing of the totalizer is formed with a small horizontal ledge 140. It is chiefly this ledge that sweeps the lever 132 into a horizontal position when the totalizer comes into computing position. The friction of the lever 132 against this ledge, due to the action of the spring 114 and to the turning action of spring 136, has been found to be not inconsiderable and to offer some appreciable resistance to the travel of the carriage; and in order to lessen this friction I provide means, including the means above described for allowing a longitudinal motion to the shaft 131, for latching the lever 132 in its deflected position when the carriage is traveling toward the left through a computing zone. To this end the lower arm of said lever is thickened or bulged out in a rounded fashion as will be understood from Figs. 1, 3 and 4. This thickened or bulged part of the lever 132 rides against the rear wall of the rib 138 which cams the lever toward the rear of the machine into the position shown in Fig. 3. In this position the lever is latched by means of a bolt 141 mounted for sliding motion in the frame piece 133 parallel with the shaft 131 and pressed toward the front of the machine by a light spring 142. When the parts are in the position shown in Fig. 3 the reduced forward end of this bolt enters a hole 143 (Fig. 5) in the lever 132. It will be understood that in the great majority of instances the carriage is brought into a computing zone by the operation of the tabulator so that said carriage is at this time moving with some velocity and with considerable force, and there is ample power to deflect the lever 132 at that time. Said lever is deflected with a considerable velocity, and it is carried thereby a little past the position at which it would press against the ledge 140, and in this somewhat advanced position it is held by the bolt 141. Even if the carriage moves into the adding zone by a step-by-step motion, as for example by the operation of the space key, still it can deflect the lever 132 even though the first two or three steps may be rendered a little sluggish. As these steps during which the actual deflection of the arm takes place are positions of the carriage in which no writing is done, this retardation of the carriage, if it occurs, does no harm. By the time the arm gets fully deflected, as it does before the first register wheel reaches the master wheel, it has been cammed toward the rear and the bolt 141 has entered the hole 143 and locked the arm in that position. In order that the arm be raised sufficiently to become latched up, and that such latching up shall relieve the subsequent friction when the carriage is thus stepped slowly into the adding zone without the use of the tabulator, it is necessary that the left-hand end of the ledge 140 be a little higher than the remainder of said ledge. This can be brought about in various ways, as, for example, by elevating the ledge 140 at its left-hand end, as shown in Fig. 12. From that time on to the end of the computing column the resistance or braking action on the totalizer is that due to the rubbing of the lever 132 against the rib 138 which thus acts as a wiper to retain the latch in latching position; and as this resistance is produced only by the compression of the spring 136 the pressure is slight and the resistance is also slight. As soon as the totalizer moves entirely away from the lever 132 said lever is moved toward the front of the machine by the spring 136 and in so doing it moves away from the bolt 141, whereupon the lever is free to resume its normal vertical position and the spring 114 lifts the bar 110 and the universal bar 84, thus disconnecting the adding machine or throwing it out of operation.

The spring 114 has to have a certain amount of stiffness in order to lift the universal bar 84 with certainty. As has been remarked above, the carriage usually comes into adding position through an operation of the tabulator and when it does so there is ample power to bend a spring of the requisite degree of strength. It has required some experimentation and contrivance, however, so to design the connections between the lever 132 and the bar 110 as to depress said bar safely and readily by means of the travel of the carriage when said carriage is merely stepped along by the space key and without putting undue tension on the feed spring of said carriage. It will, of course, be understood that when the totalizer first strikes the lever 132 the ledge 140 of said totalizer engages said lever relatively close to the pivotal axis of the lever so that at this time anything that tends to resist the deflection of said lever has a relatively high leverage on the carriage. In order to compensate for this high leverage the lower arm of the lever 125 and the link 124 are so disposed normally, as shown in Fig. 5, as to constitute the two links of a toggle, said links being then not very far removed from a straight line relation. In the beginning of the turning of said lever 125, said lever has, therefore, a relatively high leverage on the next lever 122 in the train of connections, which leverage, of course, diminishes as the lever 125 is swung about its pivot, moving the point of connection between the lever and the link 124 farther out of a straight line between the pivot 126 of said lever 125 and the point at which the link 124 is connected with the lever 122. The diminishing of the leverage is permissible because of the fact that, at the same time it is taking place, the lever 132 is approaching a horizontal position and its resistance to the motion of the typewriter carriage is becoming less. In the particular lay-out of the mechanism shown in the drawings it takes about three steps of the typewriter carriage fully to deflect the lever 132. At the first of these steps when the leverage of said lever 132 on the carriage is at its maximum the leverage of the lever 125 on the lever 132 is also at its maximum so that its resistance to the turning of the lever 132 is at a minimum. It will, of course, be understood that other forms of linkage can be substituted for the one shown, but having the same property according to which the lever 132 acts against the spring 114 with a relatively high leverage at the first part of the stroke, said leverage diminishing during the stroke.

The fact that the link 124 of the lower arm of the lever 125 so nearly constitutes a straight toggle, is a further advantage in this respect, namely, that when the typewriter carriage is withdrawn toward the right, thus deflecting the upper end of the lever 125 slightly toward the operator's right or toward the left in Fig. 5, this backward motion of said lever 125 has but little effect on the lever 122 as the two links referred to are then nearly at the dead center.

As has been remarked above, in the operation of withdrawing the typewriter carriage toward the right, the mutilated pinion 130 moves entirely out of mesh with the rack 128. It is, of course, essential that this rack then remain in its slightly deflected position until the mutilated pinion is brought back by the action of the spring 136 to its normal position. To this end a light spring 144 is provided at a suitable point in the connections controlling the lever 125. In the present instance said spring is shown acting on the lever 116, being coiled about the pivot 117 of said lever and tending to move said lever in the direction contrary to that in which the lever moves when the parts are brought into position for computing. The spring 144 is a light one and it acts on the lever 125 through the toggle connection that has been described which at that time is not very far removed from the dead center position. The action of this spring is, therefore, only sufficient to maintain the lever 125 in position to catch the pinion 130 when the latter is restored to normal.

I have provided means for automatically setting the machine for subtraction at certain portions of the travel of the carriage and for addition at other portions of said travel. This mechanism can be adjusted or regulated so as to vary the portion of the line of writing at which subtraction is performed both as to the location of said portion and also as to the extent of it, so that subtractin can be automatically performed either at the first or last or any intermediate portion of the line of writing and also in columns of different widths.

Figure 10:
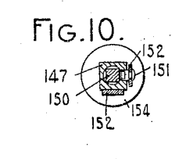
Figs. 10 and 11 are fragmentary transverse longitudinal sectional views of a detail of the add and subtract mechanism.
Figure 11:
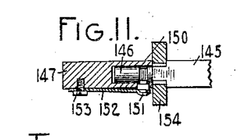

A bar 145 is mounted at the back of the typewriter carriage in any suitable way. In the present instance this bar is shown pivoted on trunnions 146 (Fig. 11) pivoted in pivot blocks 147 mounted on brackets 148 secured to the brackets 31 on which the tabulator column stop bar 30 is supported. Each of the trunnions 146 is formed with a square part 150 (Figs. 10 and 11) against which the flat end of a pin 151 is pressed by a flat spring 152 which is secured by a screw 153 to the side of the block 147. A knurled wheel or disk 154 is mounted on the bar 145 to assist in turning it which can be done at any time by exerting on said knurled disk a sufficient degree of force to overcome the springs 152.

The bar 145 is similar in its construction to the column stop bar of a tabulator and it has a series of slots 155 cut in its front and rear edges at a letter space distance apart. In these slots can be mounted any desired number of contact pieces or wipers 156 each, as here shown, consisting of a bifurcated piece of sheet metal adapted to be pushed astride of the bar 145 and into two opposite slots 155. The whole equipment of the bar 145 and its accessories, in the form in which they are shown in the drawings, has been merely adapted from tabulator parts, the bar 145 and its supports 147 being made of pieces which were manufactured for use in a tabulator and the contact pieces 156 consisting of pieces manufactured for use as column stops. It will, of course, be understood that the construction of all these parts can be varied.

When the automatic add-and-subtract mechanism is in use the wipers 156 stand as shown in Fig. 1 with the opening 157 between the two branches of each of said wipers pointing upward and said wipers projecting downward a suitable distance below the bar 145.

The wipers above described are adapted to coöperate with any suitable displaceable device, the one here shown consisting of an arm 158 rigidly fixed on and normally projecting upward from a fore and aft rock shaft 160, which rock shaft is journaled in a U-shaped frame 161 suitably mounted on the back part of the top plate 3. In the present instance the frame 161 is mounted on the bracket 28 of the escapement wheel shaft 27. The construction of all parts is such that when the typewriter carriage in its travel toward the left reaches the point where the first of the wipers 156 comes against the arm 158, said arm is deflected toward the operator's left, thus rocking the shaft 160 and through a train of connections presently to be described changing the add and subtract mechanism to position for subtraction.

Said train of connections includes an arm 162 mounted on the rear end of the shaft 160 and connected by a link 163 (Fig. 9) with an arm 164 depending from a short rock shaft 165 mounted in a pair of brackets 166 secured by a screw 167 on the top plate 3 near the left-hand side of the machine. As shown in the present instance, the brackets 166 are secured to the upright arm of a bracket 168 that is included in the ordinary equipment of the Remington typewriter, it being the bracket in which part of a certain tabulator stop set mechanism is mounted.

The rock shaft 165 (Figs. 1 and 9) has also secured thereon an arm 170 projecting toward the right therefrom and to this arm is pivoted the upper end of a link 171, the lower end of which is pivoted at 172 to an arm 173 projecting from the rear end of a long rock shaft 174, which rock shaft is journaled in two brackets 175 which are secured by screws 176 (Figs. 4 and 9) to the left-hand rear and front posts 2, respectively. At its forward end the rock shaft 174 has projecting therefrom an arm 177 which is connected by a link 178 with the arm 60 hereinbefore described, which arm 60, it will be recalled, is mounted on the rock shaft 61 of the bi-color mechanism of the typewriter and which, when the button 52 occupies its normal, rearmost position, is rigidly connected up to turn with said shaft.

The arm 60 is connected by a link 180 with a lever arm 181 (Figs. 1 and 8) mounted concentrically with the lever 91, 94 of the add and subtract mechanism of the Wahl machine. As shown in Fig. 8, the lever 181 is mounted on the hub of the lever 91, 94 and is held in place by the head of the screw 92.

The lever 181 is normally connected to the lever 91, 94 so as to be in effect merely an arm of said lever 91, 94 by means of a disengageable clutch comprising a lever 182 mounted on the lever 181 and provided with a knurled finger piece 183. The lever 182 is pivoted at its middle to the lever 181 on a hinge comprising a pivot pin 184 running through a pair of interlocking lugs 185 and 186 riveted respectively to the levers 182 and 181. On its end opposite the finger piece 183 the lever 182 has projecting therefrom two clutch pins 187 which project loosely through holes in the lever 181 and into registering holes in the lever 91, 94 as shown in Fig. 8, thus clutching the two levers together to turn in unison. Said levers can be unclutched by pressing toward the right on the finger piece 183 and thereby withdrawing the pins 187 from the lever 91, 94. When this is done the two levers can turn independently and the connection between the lever 91, 94 and the lever 181 and all of the mechanism back to and including the arm 158, is broken.

In order to hold the clutch lever 182 in its normal position shown in Fig. 8, a spring 188 is coiled about the pivot pin 184. This spring has at its middle part a loop that bears against the right-hand face of the lever 182 and the two ends of the spring are caught in notches in the lever 181.

It will be perceived that, when the arm 158 is deflected toward the left by the travel of the typewriter carriage, the link 180 is moved upward, the lever 91, 94 is rocked toward the front of the machine, and the cam slot 96 pulls the rod 98 toward the left and sets the machine for subtraction. When the carriage reaches such a point as that the arm 158 is freed from the wipers 156, the parts move back to position for addition under the impulse of the spring 93.

In order to provide for the deflection of the arm 158 toward the right when the typewriter carriage is pulled back to begin a new line, the arm 162 is not rigidly mounted on the shaft 160 but is loosely mounted thereon, being provided with a hub 200 pivoted on the shaft and held in place by a collar 201 (Fig. 2) rigidly mounted on the end of said shaft. A pin 203 projects from the shaft into a notch or cut-out 204 in the hub 200 in such fashion that when the arm 158 is rocked toward the left the pin turns the hub and the arm 162; but when the arm 158 is deflected toward the right the pin 203 can turn idly in the notch 204. In order to restore the rock shaft after such a deflection toward the right, a light torsion spring 205 is coiled about said shaft and connected at one end with a pin 206 projecting from said shaft and at the other end with the frame 161.

It will be noted that the machine is automatically set for subtraction by the left-hand one of the wipers 156 and that when the arm 158 has been deflected by this wiper it will be held deflected until all of the wipers 156 have passed over it. It will be perceived that the length of time, or rather, that the extent of carriage travel, through which the arm 158 is held deflected, will depend upon the number of wipers 156 employed; and that a subtracting column can be made wide or narrow by using a larger or smaller number of said wipers. Some totalizers have only three register wheels in them and are intended for narrow columns, and others have a much larger number of wheels and are adapted to register a much wider column of figures.

It will also be noted that the location in the line of writing at which the machine is automatically set for subtraction, can be varied by varying the position lengthwise of the bar 145 at which the wiper or the group or series of wipers 156 is located and that a subtracting column can be located anywhere by suitably positioning these wipers. It will also be obvious that several subtracting columns can be provided for by using a corresponding number of groups of wipers.

In the present instance the arm 158 is a little to one side of the middle of the machine, being so located to avoid interference with the escapement mechanism. That being so, the bar 145 is similarly off-set. The proper location of the wipers 156 can be readily determined by setting the typewriter carriage in the position in which it is desired to have subtraction occur and then setting wipers so that in that position the arm 158 will be deflected.

It is sometimes desirable to throw the automatic add and subtract mechanism out of operation entirely. In that event the bar 145 is turned from its Fig. 1 position where the automatic add and subtract mechanism is in operation, through a semi-rotation to the position shown in Fig. 2 where the line of notches or spaces 157 constitutes a sort of groove through the series of wipers 156 and where, therefore, the said wipers are inoperative on the arm 158. When the bar 145 is set in this position the automatic add and subtract mechanism is entirely out of operation.

It will also be understood that in some other machines the mechanism similar to this automatic add and subtract mechanism can be used for varying the arithmetical operation performed by the computing machine in other ways. In the machine shown in the drawings the two operations of which the computing mechanism is capable are those of addition and subtraction, but they might be addition and multiplication, or other operations.

If, when adding a column of figures an error is made, or if for any reason it is desired to subtract momentarily in said column, an operation of the key 90 will set the mechanism for subtraction, notwithstanding the automatic mechanism is connected up. If when the machine is automatically set for subtraction it is desired for the purpose of making corrections or for any other reason to add momentarily instead of subtract, then the finger piece 183 is pressed to disconnect the lever 181 from the balance of the add and subtract mechanism, whereupon the spring 93 will immediately restore the adding mechanism to addition. When the correction has been made or when for any other reason it is desired to resume the automatic operation of the mechanism, the key 90 can be depressed until the holes in the lever 91, 94 come opposite the clutch pins 187 when said clutch pins will be snapped into said holes by the action of the spring 188 and the add and subtract mechanism of the Wahl machine will thus be coupled up to the arm 158.

In the specific embodiment of the invention shown in the drawings the machine is adapted for adding English money as shown in Fig. 4 and the whole machine is set for a piece of work in which a main column of figures is to be added and totals and perhaps credit items or other items to be subtracted, are written in another column at the right of the main column. Computing in one or another of these columns is brought about by shifting the totalizer 104 back and forth between the two stops 108.

Various changes can be made in the details of construction and arrangement without departing from my invention.

What I claim as new and desire to secure by Letters Patent, is:—

1. In a combined typewriting and computing machine, the combination with printing means, a carriage and computing mechanism, of a device movable by the travel of the carriage into a computing zone into position to connect the computing mechanism up for operation and movable also to another position to disconnect said computing mechanism, and means for automatically latching said device in its connecting position, the latching and unlatching being entirely controlled by the movement of the carriage, the latching occurring as the adding zone is entered and the unlatching occurring as the carriage leaves the adding zone.

2. In a combined typewriting and computing machine, the combination with printing means, a carriage and computing mechanism, of a device movable by the travel of the carriage into a computing zone into position to connect said computing mechanism up for operation, said device being also movable to another position to disconnect said computing mechanism, a latch for holding said device in its connecting position, and a wiper for holding said latch in latching position during the travel of the carriage through a computing zone.

3. The combination with printing means, a carriage and computing mechanism for computing numbers printed by said printing means, or not computing said numbers, as required, of a device movable to two positions to connect said computing mechanism up for operation and to disconnect it, means whereby the travel of the carriage moves said device from one of said positions to the other, and means whereby the travel of the carriage imparts to said device another motion to a locking position.

4. The combination with printing means, a carriage and computing mechanism for computing numbers printed by said printing means, or not computing said numbers, as required, of a rock shaft, means for turning said rock shaft when the carriage reaches a computing zone, means operated by such turning of said shaft for connecting the computing mechanism up for operation, means for moving said shaft endwise and for thereby latching said shaft in its turned position, and means for automatically restoring said shaft to its normal position at the end of a computing operation.

5. The combination with printing means, a carriage and mechanism for computing numbers printed by said printing mechanism, or not computing said numbers, as required, said computing mechanism comprising a totalizer and a master wheel, one traveling with relation to the other, of a device deflected in two directions by said totalizer as the carriage approaches a computing zone, means operated by the motion of said device in one direction for coupling the computing mechanism up for operation, and a latch controlled by the motion of said device in the other direction.

6. The combination with a carriage and computing mechanism, of a device displaceable by the movement of the carriage when said carriage approaches a computing zone, for shifting parts of said computing mechanism, and connections between said displaceable device and said parts including means for changing the leverage of said displaceable device on said parts during the displacement of said device, whereby said device acts on said parts with a diminishing leverage.

7. The combination with a carriage and computing mechanism, of a pivoted arm, a ledge by which said arm is turned about its pivot when the carriage travels through a computing zone, and connections whereby said arm when so turned shifts a part of said computing mechanism, said connections including a variable leverage linkage constructed to afford to said arm a relatively high leverage on said part during the first portion of the turning of said arm.

8. The combination with a carriage and computing mechanism, of a pivoted arm, a ledge by which said arm is turned on its pivot when the carriage approaches a computing zone, and connections whereby said arm when so turned moves a part of said computing mechanism to operative position, said connections including a toggle to give to said arm a relatively high leverage on said part in the first portion of its motion.

9. The combination with a carriage and computing mechanism for computing numbers printed by said printing means, or not computing said numbers, as required, said computing mechanism including a universal bar movable bodily to an inoperative position, an automatic connect and disconnect mechanism including a spring-operated device for holding said universal bar in an inoperative position, an arm displaceable in one direction by the travel of said carriage in letter feed direction and displaceable in the other direction by the return motion of the carriage, and means operated by the first mentioned displacement of said arm for moving said device against the tension of said spring.

10. The combination with a carriage and computing mechanism including a totalizer for computing numbers printed by said printing means, or not computing said numbers, as required, of an oscillatory device 131 rocked by the travel of the carriage when said totalizer is in position to be operated, connections including lever 125, link 124 and lever 122, operated by said oscillatory device, and means operated by said lever 122 for connecting the computing mechanism up for operation and disconnecting it.

11. The combination with means for effecting addition and subtraction and a hand operated device for changing the mechanism from one operation to the other, of automatic means for changing said mechanism, and a clutch connection, disconnectible by hand, between said automatic means and said hand operated means.

12. The combination of computing mechanism normally in condition to perform one arithmetical operation, means shiftable to cause the mechanism to perform another arithmetical operation, a spring for restoring said shiftable means, automatic means for shifting said shiftable means against the tension of said spring, and a disconnectible clutch between said automatic means and said shiftable means.

13. The combination with computing mechanism, of a hand-operated lever for changing the arithmetical operation performed by said computing mechanism, an automatically operated lever, and a disengageable clutch between said levers.

14. The combination with a carriage and computing mechanism, of wiping means consisting of a series of wipers, a displaceable device operated by said wipers, and means operated by said displaceable device for changing the arithmetical operation to be performed by the computing mechanism, the construction being such that said series of wipers can be varied in number so as to vary the width of a computing zone in which said displaceable device is held in displaced position.

15. The combination with a carriage and computing mechanism, of wiping means, and means operated thereby for changing the character of the arithmetical operation performed by the computing mechanism, said wiping means being capable of regulation as to length, in order to regulate the number of letter space positions of the carriage during which the arithmetical operation is changed as aforesaid.

16. The combination with a carriage and computing mechanism, of wiping means, and means operated thereby for changing the character of the arithmetical operation performed by the computing mechanism, said wiping means being capable of regulation both as to location and also as to length, whereby the point in the travel of the typewriter carriage at which the arithmetical operation is changed as aforesaid can be varied and whereby the extent of carriage travel during which said changing means is held in operative condition can be regulated.

17. The combination with a carriage and computing mechanism, of wiping means, a device adapted to be displaced by said wiping means, means controlled by said displaceable device for changing the arithmetical operation performed by the computing mechanism, a disengageable clutch between said displaceable device and said changing means, and means whereby said wiping means can be set to an inoperative position.

18. The combination with printing means, a carriage and computing mechanism, said computing mechanism including a universal bar, of a spring-actuated hook for normally holding said universal bar in inoperative position, and means operated by the travel of the carriage for moving said hook against the tension of said spring to permit said universal bar to move to operative position.

19. The combination with printing means including two-color inking mechanism, a carriage, and computing mechanism including means for changing the arithmetical operation performed, of a device operated automatically by said carriage, connections from said device to said two-color ribbon mechanism and to said changing means, means for disconnecting said device from said two-color mechanism, and separate means for disconnecting said device from said changing means.

20. The combination with printing means including a two-color inking mechanism, a carriage, and computing mechanism including means for changing the arithmetical operation performed, of a device operated automatically by said carriage, connections from said device to said two-color ribbon mechanism and to said changing means, means for disconnecting said device from said two-color mechanism, separate means for disconnecting said device from said changing means, and means for throwing said device out of operation.

21. The combination with a carriage, a two-color inking mechanism and computing mechanism; of a device automatically displaceable by the travel of said carriage when the carriage comes to a computing zone, means moved by said displaceable device when the latter is displaced to effect a change in the arithmetical operation performed by the computing mechanism, said mechanism being restored to normal condition by the restoration of said displaceable device; and means simultaneously automatically shifting the inking mechanism to change the color of the printing.

22. The combination with a carriage, a two-color inking mechanism and mechanism for computing in a plurality of columns; of a device automatically displaceable by the travel of said carriage when the carriage comes to a computing zone; and means whereby said displaceable device when the latter is displaced automatically shifts said inking mechanism to change the color of the printing according to the column in which the printing is then to be done.

23. The combination with a carriage, a two-color inking mechanism and computing mechanism; of a device automatically displaceable by the carriage when said carriage comes into a computing zone; a connection from said displaceable device to said two-color mechanism to change the color of the printing in said zone; a connection from said device to the computing mechanism to change the arithmetical operation performed by said mechanism; and means for disconnecting said device from said computing mechanism without disconnecting said device from said two-color mechanism.

24. The combination with printing means, a carriage and computing mechanism including a totalizer, keys and a master wheel, of a device movable to one position to bring said master wheel under the control of said keys and to another position to render said master wheel inoperative by said keys, means whereby said carriage, when said totalizer comes into register with said master wheel, moves said device to the first mentioned position, and means for latching said device in such position, said latching means being automatically released when the totalizer passes out of register with said master wheel.

Signed at the borough of Manhattan, city of New York, in the county of New York and State of New York, this 4th day of March, A. D. 1915.

WILLIAM GARFIELD SHELDON.

Witnesses:
CHARLES E. SMITH,
E. M. WELLS.

Copies of this patent may be obtained for five cents each, by addressing the "Commissioner of Patents, Washington, D. C."